United States Patent [19]
Taniguchi et al.

[11] Patent Number: 5,887,624
[45] Date of Patent: Mar. 30, 1999

[54] ELECTROMAGNETIC VALVE DEVICE

[75] Inventors: Takeshi Taniguchi; Akira Fujimoto; Tsutomu Kurita, all of Miyazaki-ken; Takaomi Shirase; Naotoshi Tamai, both of Nagano-ken, all of Japan

[73] Assignees: Kabushiki Kaisha Honda Lock, Miyazaki-ken; Nissin Kogyo Co., Ltd., Nagano-ken, both of Japan

[21] Appl. No.: 849,528

[22] PCT Filed: Oct. 23, 1996

[86] PCT No.: PCT/JP96/03083

§ 371 Date: Oct. 16, 1997

§ 102(e) Date: Oct. 16, 1997

[87] PCT Pub. No.: WO97/15936

PCT Pub. Date: Jan. 5, 1997

[30] Foreign Application Priority Data

| Oct. 23, 1995 | [JP] | Japan | 7-274566 |
| Oct. 23, 1995 | [JP] | Japan | 7-274567 |
| Oct. 23, 1995 | [JP] | Japan | 7-274578 |

[51] Int. Cl.[6] .................................................. F16K 31/02
[52] U.S. Cl. .................. 137/884; 137/596.17; 303/119.2
[58] Field of Search .......................... 251/129.09, 129.1; 137/884, 596.17; 303/119.1, 119.2

[56] References Cited

U.S. PATENT DOCUMENTS

| 5,125,432 | 6/1992 | Fujii et al. ............................ 137/884 X |
| 5,152,322 | 10/1992 | Maas et al. ............................. 137/884 |
| 5,449,019 | 9/1995 | Hara ................................ 303/119.2 X |
| 5,449,227 | 9/1995 | Steinberg et al. ................... 303/119.2 |
| 5,482,362 | 1/1996 | Robinson . | |
| 5,522,424 | 6/1996 | Dalton, Jr. et al. ................. 137/884 X |
| 5,611,372 | 3/1997 | Bauer et al. ............................ 137/884 |

FOREIGN PATENT DOCUMENTS

| 0 675 030 A2 | 10/1995 | European Pat. Off. . |
| 41 11 987 C2 | 10/1992 | Germany . |
| 41 12 920 A1 | 10/1992 | Germany . |
| 43 06 769 A1 | 9/1994 | Germany . |
| 43 25 410 A1 | 2/1995 | Germany . |
| 43 43 325 A1 | 6/1995 | Germany . |
| 44 36 618 A1 | 4/1996 | Germany . |
| 195 18 519 A1 | 11/1996 | Germany . |
| 196 19 968 A1 | 11/1997 | Germany . |
| 4-171702 | 6/1992 | Japan . |
| 6-122364 | 5/1994 | Japan . |
| 7-47938 | 2/1995 | Japan . |

*Primary Examiner*—Kevin Lee
*Attorney, Agent, or Firm*—Nikaido, Marmelstein, Murray & Oram LLP

[57] ABSTRACT

An electromagnetic valve device includes a valve operating unit formed by disposing valve components in a valve housing having a guide cylinder and mounted to a base member, and a tip end of the guide cylinder and a housing body are magnetically connected to each other by a magnetic path defining frame surrounding a coil wound around a bobbin. The bobbin is buried in a mold section made of synthetic resin to form a coil unit. The coil unit is mounted to the base member. One end of the magnetic path defining frame is formed with a fitting bore through which the tip end of the guide cylinder is fitted, and the other end of the magnetic path defining frame is capable of abutting against the housing body. The magnetic path defining frame is mounted to a coil-correspondence portion of the mold section. The guide cylinder is loosely passed through a center bore of the bobbin. With this arrangement, a magnetic path can reliably be formed by the magnetic path defining frame, and the coil, bobbin and magnetic path defining frame can easily be mounted to each of the valve operating units.

4 Claims, 13 Drawing Sheets

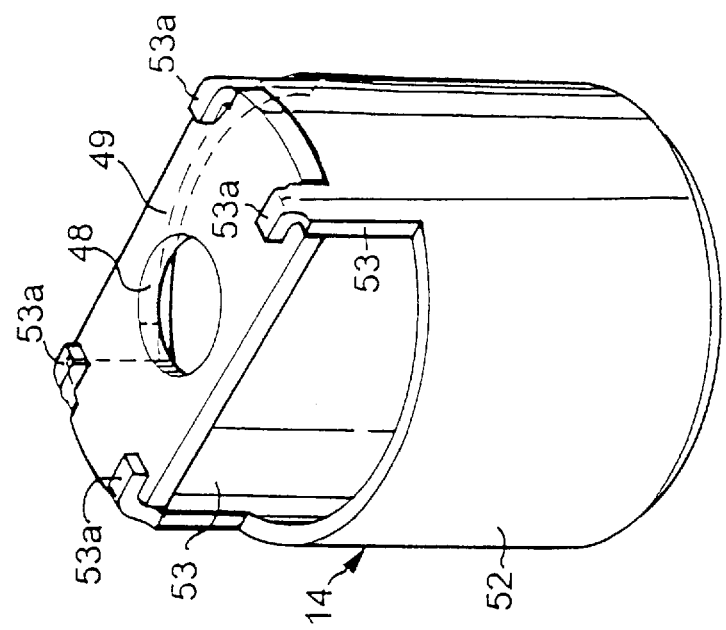
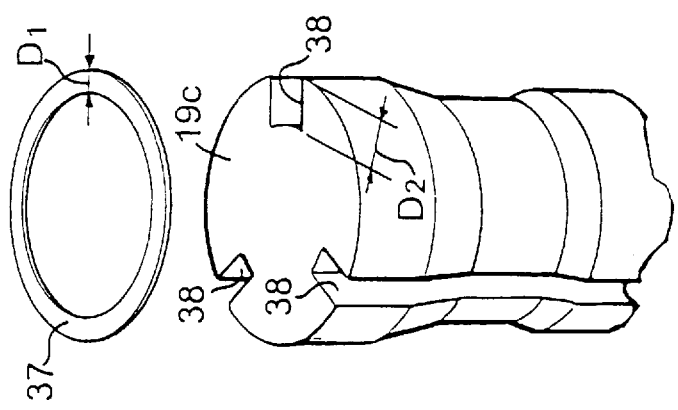
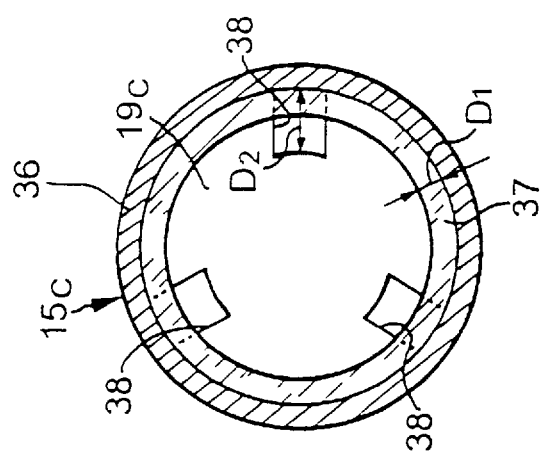

ELECTROMAGNETIC VALVE DEVICE

BACKGROUND OF THE INVENTION

1. Field of the Invention

The present invention relates to an electromagnetic valve device comprising a plurality of valve operating units, each including valve components such as a stationary core, a movable core, a valve body and a return spring, which are disposed in a valve housing having a guide cylinder connected at its base end to a housing body fitted to and secured to a base member; a plurality of bobbins each having a center bore through which each of the guide cylinders are passed; a plurality of coils each wound around each of the bobbins; a plurality of magnetic path defining frames each of which surrounds each of the coils to magnetically couple a tip end of the guide cylinder and the housing body to each other.

2. Description of the Related Art

The above described electromagnetic valve device is already known from Japanese Patent Application Laid-open No. 7-47938, for example.

In such a known electromagnetic valve device, the plurality of bobbins around which the coils are wound and the plurality of the magnetic path defining frames are assembled as a unit so as to be common to a plurality of valve operating units mounted to a base member. And in a state where each of the valve operating units is mounted to the base member, the common unit is mounted to the base member to simplify the assembling operation. However, there is a tolerance in relative position between the plurality of valve operating units mounted to the base member and each of the bobbins and magnetic path defining frames in the common unit. Therefore, in the electromagnetic valve device in which each of the magnetic path defining frames is positioned at a constant location with respect to each of the bobbins, as in the above described publication, it may be difficult, in some cases, to smoothly insert the guide cylinder of the valve operating unit into each of the bobbins due to the tolerance in relative position. Further, if an inner diameter of the center bore of the bobbins is set greater than an outer diameter of the guide cylinder so as to absorb the tolerance in relative position, a relatively large gap is produced between the magnetic defining frame and the guide cylinder and thus, it may be difficult, in some cases, to form a magnetic path by the magnetic path defining frame.

SUMMARY OF THE INVENTION

The present invention has been accomplished in view of the above circumstances, and it is an object of the invention to provide a electromagnetic valve device in which the magnetic path can reliably be formed by the magnetic path defining frame, and each of the bobbins around which the coil is wound and the magnetic path defining frame can easily be assembled to each of the valve operating units.

To achieve the above object, the present invention provides an electromagnetic valve device comprising: a plurality of valve operating units, each including valve components such as a stationary core, a movable core, a valve body and a return spring, which are disposed in a valve housing having a guide cylinder connected at base end thereof to a housing body fitted to and secured to a base member; a plurality of bobbins each having a center bore through which each of the guide cylinder is passed; a plurality of coils each wound around each of the bobbins; a plurality of magnetic path defining frames each of which surrounds each of the coils to magnetically couples a tip end of the guide cylinder and the housing body to each other; wherein the plurality of bobbins having the coils wound therearound are buried in a mold section made of a synthetic resin to form a coil unit, the coil unit being mounted to the base member, and each of the magnetic path defining frames being movably mounted in a cylindrical coil correspondence portion formed in the mold section to cover each of the bobbins and each of the coils wound around the bobbins; and the magnetic path defining frames each provided at one end thereof with a fitting bore into which the tip end of the guide cylinder is fitted, the other end of each of the magnetic path defining frames being capable of abutting against the housing body, the magnetic path defining frames being movably mounted to the coil-correspondence portions, each of the guide cylinders being loosely passed through the center bore of each of the bobbins.

With the above arrangement, the tolerance in relative position between the plurality of valve operating units mounted to the base member and each of the coil-correspondence portions in the coil unit mounted to the base member is absorbed by a loose movement of the magnetic path defining frame, thereby allowing the guide cylinder to smoothly pass through the center bore of each of the bobbins, and allowing the guide cylinder to easily fit into the fitting bore of the magnetic path defining frame. Therefore, the bobbins and the magnetic path defining frame can easily be mounted to the coil unit, and the magnetic path can reliably be formed by the magnetic path defining frame.

According to another aspect of the invention, the electromagnetic valve device further includes springs each provided between each of the coil-correspondence portions and each of the magnetic path defining frames for biasing each of the magnetic path defining frames in a direction to come into abutment at its other end against each of the housing bodies. With this arrangement, the magnetic path defining frame can reliably be abutted against the housing body, and the magnetic path can reliably be formed by the magnetic path defining frame.

The above and further objects, features and advantages of the present invention will become more apparent from the following detailed description taken in conjunction with the accompanying drawings.

BRIEF DESCRIPTION OF THE DRAWINGS

FIGS. 1 to 11 show a first embodiment of the present invention, wherein

FIG. 1 is a vertical sectional view of an electromagnetic valve device, taken along the line 1—1 in FIG. 2;

FIG. 2 is a plan view taken along the arrow 2 in FIG. 1, but a lid is omitted;

FIG. 3 is a longitudinal sectional view showing an end surface of a movable core, at the side of a stationary core, of a normally closed type electromagnetic valve;

FIG. 4 is a perspective view of the movable core and a magnetic force killer;

FIG. 5 is a perspective view of a magnetic path defining frame;

FIG. 6 is a plan view of a conductor plate assembly;

FIG. 7 is a side view of the conductor plate assembly taken along the arrow 7 in FIG. 7;

FIG. 8 is a bottom view of the conductor plate assembly taken along the arrow 8 in FIG. 7;

FIG. 9 is a plan view showing a connection state between the conductor plate assembly and each of coils;

FIG. 10 is a side view of a conductor plate material; and

FIG. 11 is an enlarged sectional view taken along the line 11—11 in FIG. 7.

FIGS. 12 to 18 show a second embodiment of the invention, wherein

FIG. 12 is a vertical sectional view of an electromagnetic valve device;

FIG. 13 is a plan view taken along the arrow 13 in FIG. 12, but a lid is omitted;

FIG. 14 is a side view of a conductor plate assembly;

FIG. 15 is a plan view showing a connection state between the conductor plate assembly and each of coils;

FIG. 16 is a sectional view of the conductor plate assembly taken along the line 16—16 in FIG. 15;

FIG. 17 is a side view of a conductor plate material; and

FIG. 18 is a sectional view taken along the line 18—18 in FIG. 14.

DETAILED DESCRIPTION OF THE PREFERRED EMBODIMENTS

Figure 1:
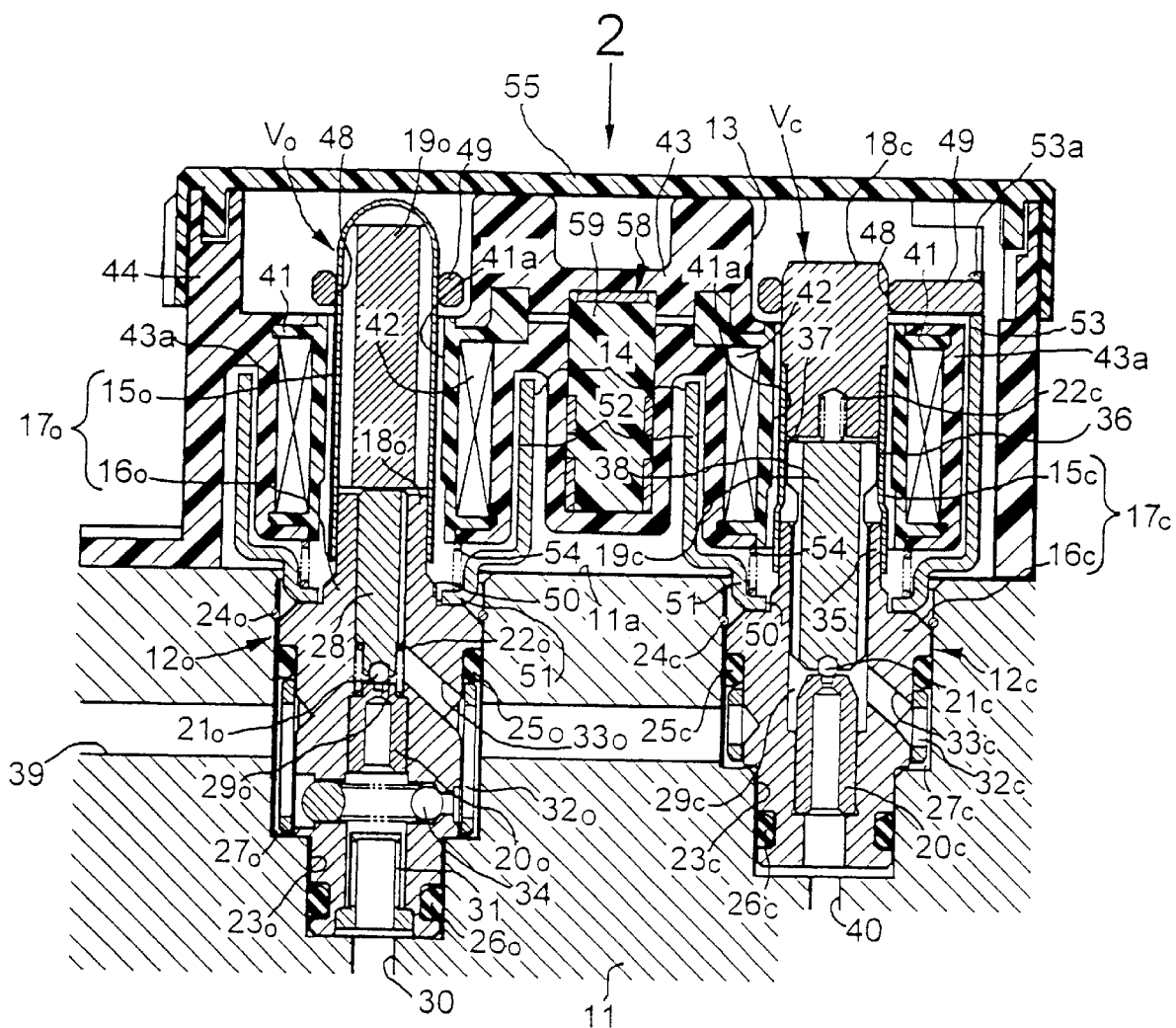
Figure 2:
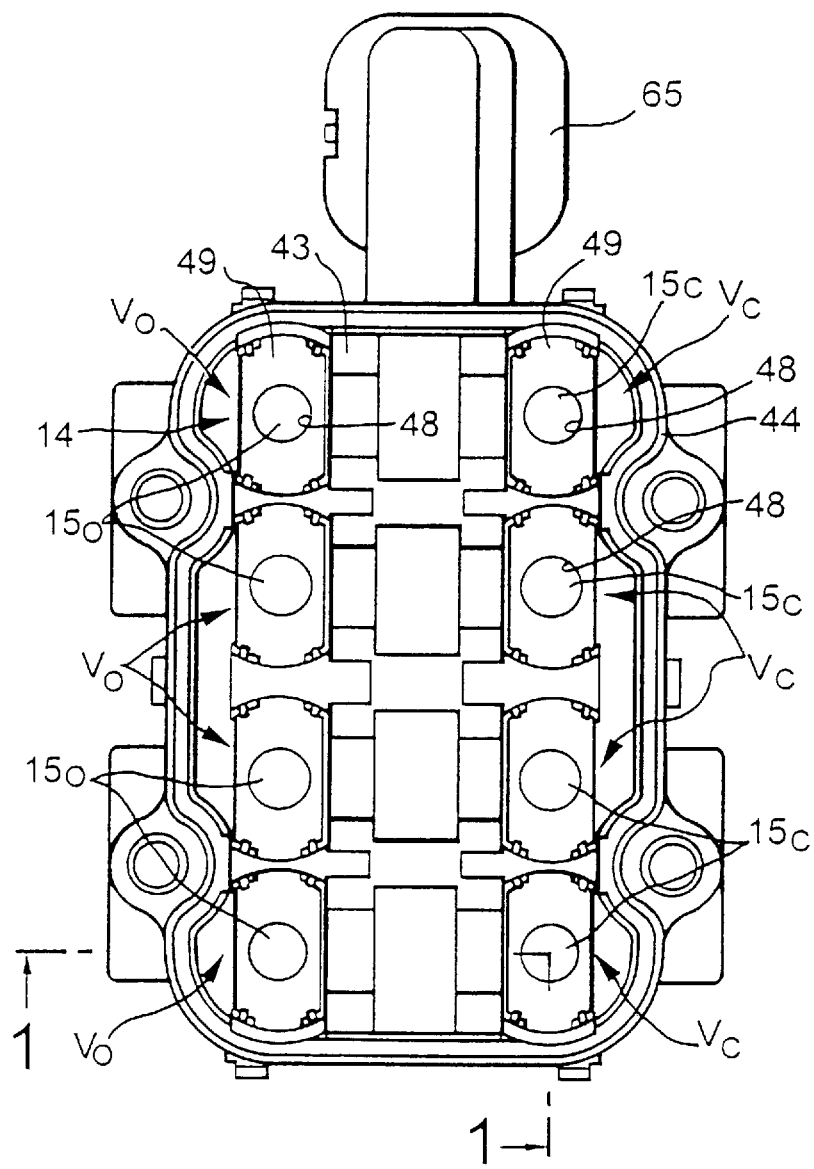

A first embodiment of the present invention will now be described with reference to FIGS. 1 to 11. First, in FIGS. 1 and 2, there is shown an electromagnetic valve device for an antilock brake control of a vehicle, such as a four wheel vehicle, for example. The electromagnetic valve device includes four normally closed type electromagnetic valves $V_o$, and four normally opened type electromagnetic valves $V_c$, each independently corresponding to each of wheel brakes, and each disposed on a common metal base member 11.

Each of the normally opened electromagnetic valves $V_o$ comprises a valve operating unit $12_o$, a coil unit 13 which is common to each of the normally opened electromagnetic valves $V_o$ and each of the normally closed type electromagnetic valves $V_c$, and electromagnetic path defining frame 14 mounted to the coil unit 13.

The valve operating unit $12_o$ includes a valve housing $17_o$ which comprises a guide cylinder $15_o$ formed into a bottomed cylindrical shape whose leading end is closed, and a housing body $16_o$ to which a base end of the guide cylinder $15_o$ is continuously formed. Disposed in the valve housing $17_o$ are valve components such as: a stationary core $18_o$ fixedly disposed within the base end of the guide cylinder $15_o$; a movable core $19_o$ accommodated in the guide cylinder $15_o$ such as to oppose to the stationary core $18_o$; a valve body $21_o$ which is capable of sitting on a valve seat member $20_o$ fixedly mounted to the valve housing $17_o$ and which is operatively connected to the movable core $19_o$; and a return spring $22_o$ for biasing the movable core $19_o$ in a direction to separate away from the stationary core $18_o$, i.e., for biasing the valve body $21_o$ in a direction to separate away from the valve seat member $20_o$.

The housing body $16_o$ is formed into a stepped cylindrical shape and is made of magnetic metal. One end of the housing body $16_o$ is integrally and coaxially formed with the stationary core $18_o$ which is formed cylindrically. The guide cylinder $15_o$ is made of non-magnetic material such as stainless steel, and is formed into a thin bottomed cylindrical shape whose tip end is hemispherical and closed. The stationary core $18_o$ is fitted into the base end of the guide cylinder $15_o$, and such a base end is coupled to the housing body $16_o$ by welding, for example.

The base member 11 is formed at its one surface 11a with a stepped fitting bore $23_o$ into which the housing body $16_o$ can fit. Mounted to the base member 11 at its inner surface closer to an opening end of the fitting bore $23_o$ is a retaining ring $24_o$ which is engaged with the housing body $16_o$ for preventing the latter from escaping out from the fitting bore $23_o$. Further, in a state where the housing body $16_o$ is fitted and fixed in the fitting bore $23_o$, the guide cylinder $15_o$ is projected from the one surface 11a. Also, annular seal members $25_o$ and $26_o$ are mounted to an outer surface of the housing body $16_o$ at locations spaced away from each other in its axial direction. An annular chamber $27_o$ is formed between the seal members $25_o$ and $26_o$, as well as between the base member 11 and the housing body $16_o$.

The cylindrical valve seat member $20_o$ is press-fitted and fixed in the housing body $16_o$. A valve stem 28 made of non-magnetic material is slidably fitted into the housing body $16_o$ One end of the valve stem 28 is abutted against one end of the movable core $19_o$ which is slidably fitted in the guide cylinder $15_o$ so as to oppose to the stationary core $18_o$, and a spherical valve body $21_o$ which is capable of sitting on the valve seat member $20_o$ is secured to the other end of the valve stem 28. Further, a valve chamber $29_o$ is formed between the other end of the valve stem 28 and the valve seat member $20_o$, and the return spring $22_o$ is accommodated in the valve chamber $29_o$ for biasing the valve stem 28, i.e., valve body $21_o$ in a direction to separate away from the valve seat member $20_o$. In a state where a magnetic attracting force toward the stationary core $18_o$ is not applied to the movable core $19_o$, the movable core $19_o$ is in a position retreated until received by the closed tip end of the guide cylinder $15_o$ by a spring force of the return spring $22_o$.

Mounted to the housing body $16_o$ is a filter 31 interposed between the valve seat member $20_o$ and a brake pressure passage 30 formed in the base member 11 and leading to a master cylinder which is not shown. A filter $32_o$ is mounted to an outer periphery of the housing body $16_o$ at its portion facing the annular chamber $27_o$. The housing body $16_o$ is provided with a passage $33_o$ for bringing the valve chamber $29_o$ into communication with the annular chamber $27_o$ through the filter $32_o$. Further, disposed between the filter 31 and the valve seat member $20_o$ of the housing body $16_o$ is a check valve 34 which closes for returning a working liquid in the annular chamber $27_o$ toward the brake pressure passage 30 when a pressure in the brake pressure passage 30 is lowered than that in the annular chamber $27_o$.

The normally closed type electromagnetic valve $V_c$ comprises a valve operating unit $12_c$, a coil unit 13 and a magnetic path defining frame 14 mounted to the coil unit 13.

The valve operating unit $12_c$ including a valve housing $17_c$ which comprise a guide cylinder $15_c$ whose leading end is closed, and a valve housing continuously formed with a base end of the guide cylinder $15_c$. Disposed in the valve housing $17_c$ are valve components such as: a stationary core $18_c$ fixedly mounted to a tip end of the guide cylinder $15_c$; a movable core $19_c$ accommodated in the guide cylinder $15_c$ and the housing body $16_c$ such as to oppose to the stationary core $18_c$; a valve body $21_c$ which is capable of sitting on a valve seat member $20_c$ fixedly mounted to the valve housing $17_c$ and which is secured to the movable core $19_c$; and a return spring $22_c$ for biasing the movable core $19_c$ in a direction to separate away from the stationary core $18_c$, i.e., for biasing the valve body $21_c$ in a direction to seat on the valve seat member $20_c$.

The housing body $16_c$ is formed into a stepped cylindrical shape and is made of magnetic metal. A cylindrical connection cylinder 35 is integrally and coaxially formed to one end of the housing body $16_c$. The guide cylinder $15_c$ is formed into a thin cylindrical shape, and is comprised of a cylindrical sleeve 36 made of a non-magnetic material such as stainless steel. One end of the sleeve 36 is closed by fixing the stationary core $18_c$ thereto, thereby forming the tip end of the guide cylinder $15_c$ into a semispherical closed end. A base end of the guide cylinder $15_c$ is fitted and coupled to the housing body $16_c$ by welding, for example.

The base member 11 is formed at its one surface 11a with a stepped fitting bore $23_c$ into which the housing body $16_c$ can fit. Mounted to the base member 11 at its inner surface closer to an opening end of the fitting bore $23_c$ is a retaining ring $24_c$ which is engaged with the housing body $16_c$ for preventing the latter from escaping out from the fitting bore $23_c$. Further, in a state where the housing body $16_c$ is fitted and fixed in the fitting bore $23_c$, the guide cylinder $15_c$ is projected from the one surface 11a. Also, annular seal members $25_c$ and $26_c$ are mounted to an outer surface of the housing body $16_c$ at locations spaced away from each other in its axial direction. An annular chamber $27_c$ is formed between the seal members $25_c$ and $26_c$, as well as between the base member 11 and the housing body $16_c$.

The cylindrical valve seat member $20_c$ is press-fitted and fixed in the housing body $16_c$. The movable core $19_c$ is opposed at its one end to the stationary core $18_c$, and is slidably fitted to the sleeve 36 and the housing body $16_c$ in the guide cylinder $15_c$. The spherical valve body $21_c$ is capable of sitting on the valve seat member $20_c$, and is secured to the other end of the movable core $19_c$. Accommodated between the one end of the movable core $19_c$ and the stationary core $18_c$ is a return spring $22_c$ for biasing the movable core $19_c$, i.e., the valve body $21_c$ in a direction to separate away from the stationary core $18_c$ and to approach the valve seat member $20_c$. In a state where a magnetic attracting force toward the stationary core $18_c$ is not applied to the movable core $19_c$, the valve body $21_c$ is in a position to sit on the valve seat member $20_c$.

When the movable core $19_c$ is magnetically attracted toward the stationary core $18_c$, if the movable core $19_c$ is directed contacted with the stationary core $18_c$, a separating movement of the movable core 19c from the stationary core $18_c$ is delayed due to residual magnetic force which is left when the magnetic attraction is stopped. In order to avoid such delay, a magnetic force killer 37 made of non-magnetic material is interposed between the stationary core $18_c$ and the movable core $19_c$ as shown in FIGS. 3 and 4. A valve chamber 29c is provided between the stationary core $18_c$ and the movable core $19_c$, as well as between the movable core $19_c$ and the valve seat member $20_c$. In order to avoid that a working liquid is shut in the valve chamber $29_c$ and a smooth operation of the movable core $19_c$ is obstructed, a single or a plurality of passage grooves 38 is provided in an outer surface of the movable core $19_c$ between axially opposite ends thereof.

The magnetic force killer 37 is formed into a ring-like shape out of a thin plate having a constant width $D_1$ along a circumferential direction, for example. A depth $D_2$ of each of the passage groove 38 is set larger than the width $D_1$ of the magnetic force killer 37. With this arrangement, even if the magnetic force killer 37 is displace relative to the movable core $19_c$ in the guide cylinder $15_c$ on a plane perpendicular to the axis of the guide cylinder $15_c$, at least one of the passage grooves 38 is not closed by the magnetic force killer 37, therefore, portions of all of the passage grooves 38 are always opened at one end of the movable core $19_c$.

Referring again to FIG. 1, a filter $32_c$ is mounted to a portion of an outer periphery of the housing body $16_c$ which faces an annular chamber $27_c$. The housing body $16_c$ is provided with a passage $33_c$ for bringing the valve chamber $29_c$ into communication with the annular chamber $27_c$ through the filter $32_c$. The base member 11 is provided with a brake pressure passage 39 which is connected to a wheel brake not shown and is in communication with the annular chambers $27_o$ and $27_c$ which are to each other. The base member 11 is also provided with a release passage 40 which is connected to a reservoir not shown and is in communication with the valve seat member $20_c$ of the normally closed type electromagnetic valve $V_c$.

The coil unit 13 is formed by burying a plurality of bobbins 41 having center bores 41a through which guide cylinders $15_o$ and $15_c$ of the valve operating units $12_o$ and $12_c$, into a mold section 43 made of synthetic resin, in a state where coils 42 are wound around the bobbins 41. The mold section 43 is clamped to the one surface 11a of the base member 11 and is integrally formed with a square frame 44 to which a lid 55 is detachably mounted. The mold section 43 includes a plurality of cylindrically formed coil-correspondence portion 43a for individually covering the bobbins 41 and the coils 42 wound around the bobbins 41.

Referring also to FIG. 5, the magnetic path defining frame 14 is formed by coupling a rectangular magnetic path plate 49 and a bottomed cylindrical shaped magnetic path cylinder 52. The magnetic path plate 49 is opposed to one end of the coil-correspondence portion 43a and includes a fitting bore 48 into which a tip end of any one of the guide cylinders $15_o$ and $15_c$ projected from one end of the coil-correspondence portion 43a is fitted. The magnetic path cylinder 52 is provided at its central portion with an insertion bore 50 through which any one f the stationary core $18_o$ and the connection cylinder 35 is passed, and is closed by a dish-like to form a closed end.

The bottomed cylindrical magnetic path cylinder 52 is integrally provided, at its portion at the side of its opened end, with a pair of connection arms 53, 53 and tip ends thereof abut against opposite ends of the magnetic path plate 49. Further, each of the connection arms 53, 53 is provided, at its opposite sides of its tip end, with a pair of caulking portions 53a, 53a. The caulking portions 53a, 53a are engaged by caulking with opposite ends of the magnetic path plate 49 which abuts against the tip ends of the connection arms 53, 53 thereby coupling the magnetic path plate 49 and the magnetic path cylinder 52 to each other to form the magnetic path defining frame 14.

The magnetic path defining frame 14 is mounted to the coil unit 13 by coupling, the magnetic path cylinder 52 through which the coil-correspondence portion 43a is inserted and the magnetic path plate 49, and the magnetic path plate 49 opposed to one end of the coil-correspondence portion 43a, to each other. A distance between the magnetic path plate 49 and the abutting portion 51, and an inner diameter of the magnetic path cylinder 52 are set so that the magnetic path defining frame 14 can loosely move with respect to the coil-correspondence portion 43a. The magnetic path frame 14 is mounted to the coil unit 13 such that the magnetic path frame 14 can loosely move with respect to the coil-correspondence portion 43a.

In such a magnetic path frame 14, a diameter of the fitting bore 48 formed in the magnetic path plate 49 is set such that when either one of the guide cylinders $15_o$ and $15_c$ is inserted into the fitting bore 48, an inner surface of the fitting bore 48 is contacted with an outer surface of the one of the guide cylinders $15_o$ and $15_c$. Whereas, a diameter of the insertion bore 50 formed in the abutting portion 51 is set such that the guide cylinder $15_o$ or $15_c$ can loosely be passed therethrough.

A spring 54 is compressed between the other end of each of the coil-correspondence portions 43a and the abutting portion 51 of each of the magnetic path defining frames 14 for exhibiting a repulsion force in a direction for bringing the abutting portion 51 into abutment against either one of the housing bodies $16_o$ and $16_c$.

A conductor plate assembly 58 for electrically contacting with the coils 42 of each of the normally opened type electromagnetic valves $V_o$ and each of the normally closed type electromagnetic valves $V_c$ is buried in the mold section 43 between an array of the normally opened type electromagnetic valves $V_o$ and an array the normally closed type electromagnetic valves $V_c$.

Figure 6:
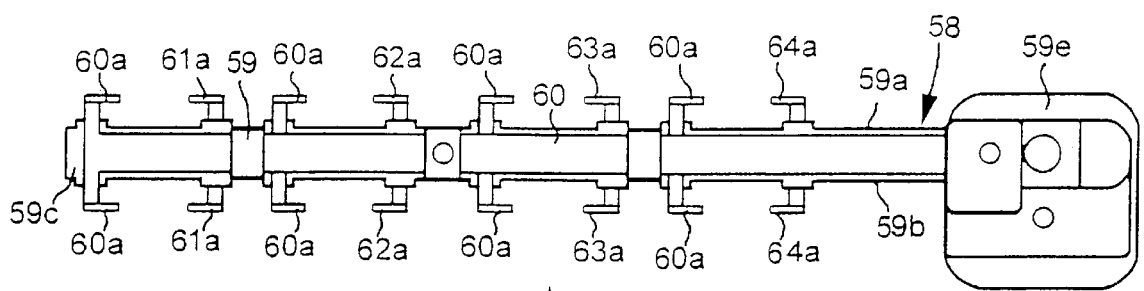
Figure 7:
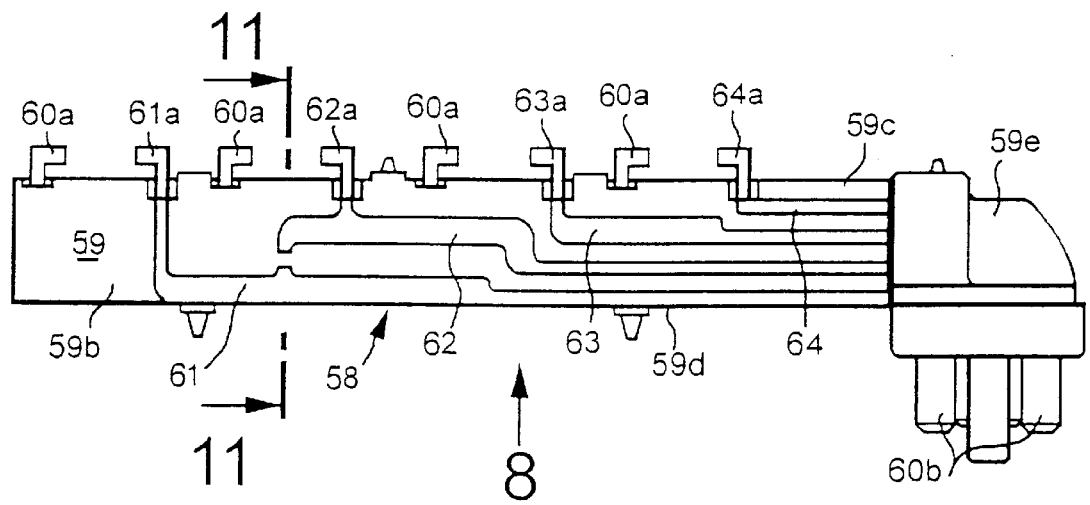
Figure 8:
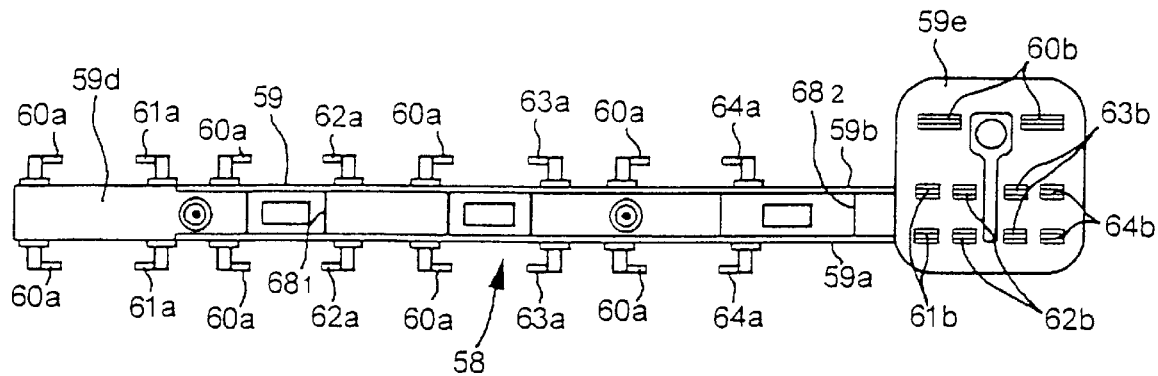

Referring to FIGS. 6, 7 and 8, the conductor plate assembly 58 comprises a common conductor plate 60 and two sets of a pair of individual conductor plates 61, 62, 63 and 64 which are integrally coupled with a conductor supporting base member 59 by insert-molding.

Figure 9:
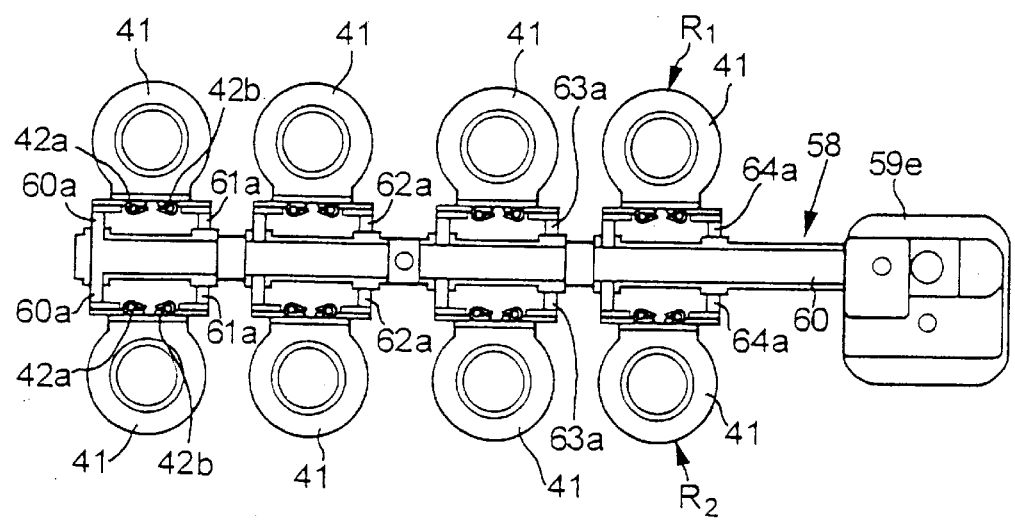

As is shown in FIG. 9, before the coil unit 13 is formed, the bobbins 41 around which the coils 42 are wound are arranged in two parallel arrays each consisting of four bobbins 41 to form two bobbin arrays $R_1$ and $R_2$. The conductor assembly 58 is disposed between the two bobbin arrays $R_1$ and $R_2$. Further, each of the bobbins 41 assumes an attitude such that opposite terminals 42a and 42b of the coil 42 wound around the bobbin 41 are disposed at the inner side of both the bobbin arrays $R_1$ and $R_2$.

The conductor supporting base member 59 includes first and second sides 59a and 59b which are opposed to the bobbin arrays $R_1$ and $R_2$, respectively, and third and fourth sides 59c and 59d perpendicular to the first and second sides 59a and 59b, respectively, and is formed into a prism-like shape having a rectangular cross section made of synthetic resin. The individual conductor plates 61 to 64 are coupled by insertion with the first and second sides 59a and 59b, respectively, and the common conductor plate 60 is insert-coupled with the third side 59c among the third and fourth sides 59c and 59d.

A connection terminal 60a connected to one of the terminals 42a of the coil 42 wound around each of the bobbins 41 of both the bobbin arrays $R_1$ and $R_2$ is provided by four each for each of the bobbin arrays $R_1$ and $R_2$. The connection terminals 60a are projected sideways from the conductor supporting base member 59. The individual conductor plates 61 to 64 are respectively provided with connection terminals 61a to 64a connected to other terminal 42b of the coil 42 wound around each of the bobbins 41. These connection terminals 61a to 64a are projected sideways from the conductor supporting base member 59 such as to form a pair with the connection terminals 60a of the common conductor plate 60.

A coupler portion 59e is provided at longitudinally one end of the conductor supporting base member 59. Mounted to the coupler 59e are: a pair of connection terminals 60b, 60b mounted to the common conductor plate 60; and connection terminals 61b to 64b respectively mounted to the individual conductor plates 61 to 64. The conductor supporting base member 59 is formed such that when the conductor plate assembly 58 is buried in and integrally formed with the mold section 43 together with the bobbins 41, the coupler 59e is projected from the frame 44. By covering the coupler 59e with a covering member made of synthetic resin, another coupler 65 (see FIG. 2) to which the connection terminals 60b, 60b, 61b to 64b is integrally formed with the frame 44.

Figure 10:
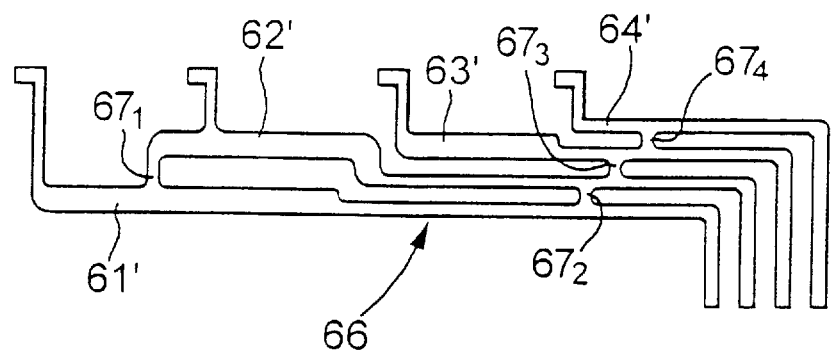
Figure 11:
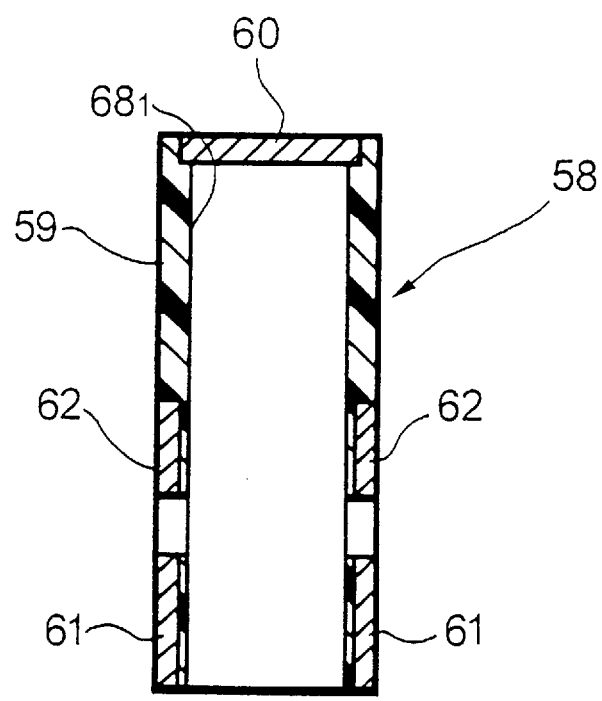

Meantime, when forming the individual conductor plates 61 to 64, a conductor plate material 66 is prepared by press molding as shown in FIG. 10. The conductor plate material 66 comprises conductor plate portions 61' to 64' having shapes respectively corresponding to the individual conductor plates 61 to 64 which are respectively mounted to one of the first and second sides 59a and 59b, and the conductor plate portions 61' to 64' are connected to one another by means of connection plates $67_1$ to $67_4$. More specifically, the conductor plate 61' corresponding to the individual conductor plate 61 and the conductor plate 62' having the shape corresponding to the individual conductor plate 62 are connected to each other by means of the connection plates $67_1$ and $67_2$, the conductor plate 62' and the conductor plate 63' having the shape corresponding to the individual conductor plate 63 are connected to each other by means of the connection plate $67_3$, and the conductor plate 63' and the conductor plate 64' having the shape corresponding to the individual conductor plate 64 are connected to each other by means of the connection plate $67_4$.

The conductor plate material 66 having the above mentioned shape is prepared in pair, and such a pair of conductor plate materials 66 and the common conductor plate 60 are integrally coupled with the conductor supporting base member 59 by the insert-molding using synthetic resin. As is clearly shown in FIG. 11, the molded conductor supporting base member 59 is formed with a hollow $68_1$ corresponding to the connection plate $67_1$ of the conductor plate material 66 and a hollow $68_2$ corresponding to the connection plates $67_2$ to $67_4$ of the conductor plate material 66. By knocking the connection plates $67_1$ to $67_4$ until they reach the hollows $68_1$ and $68_2$ to cut off these plates, separated conductor plates 61' to 64', i.e., the individual conductor plates 61 to 64 are formed.

Next, the operation of the first embodiment will be described. A plurality of the magnetic path defining frames 14 magnetically coupling the tip ends of the guide cylinders $15_o$ and $15_c$ and the housing bodies $16_o$ and $16_c$ is mounted to the mold section 43 made of synthetic resin in which a plurality of bobbins 41 each having coil 42 therearound are buried, such that the magnetic path defining frames 14 can loosely move with respect to the cylindrical coil-correspondence portion 43a individually covering each of the bobbins 41 and the coils 42 and formed in the mold section 43. The guide cylinders $15_o$ and $15_c$ are loosely passed through the center bores 41a of the bobbins 41. Therefore, a tolerance of relative positions of a plurality of the valve operating units $12_o$ and $12_c$ mounted to the base member 11 and each of the coil-correspondence portions 43a in the coil unit 13 which is integral with the frame 44 clamped to the base member 11 is absorbed by the loose movement of the magnetic path defining frames 14. Hence, the guide cylinders $15_o$ and $15_c$ can smoothly be inserted into the center bores 41a of the bobbins 41, the guide cylinders $15_o$ and $15_c$ can be fitted into the fitting bores 48 of the magnetic path defining frames 14, and the coil unit 13 can easily be mounted to the base member 11.

Further, because the spring 54 is provided between each of the coil-correspondence portions 43a and each of the magnetic path defining frames 14 for biasing each of the abutting portions 51 of the magnetic path defining frames 14 in the direction to abut against each of the housing bodies $16_o$ and $16_c$, even if the magnetic path defining frames 14 are loosely movable with respect to the coil-correspondence portions 43a, the abutting portions 51 can reliably abut against the housing bodies $16_o$ and $16_c$ when the coil unit 13 is to be mounted to the base member 11, and the housing bodies $16_o$ and $16_c$ and the magnetic path defining frames 14 can reliably be coupled magnetically to each other.

In the normally closed type electromagnetic valves $V_c$, the magnetic force killer 37 interposed between the stationary core $18_c$ and the movable core $19_c$ is formed into the ring-like shape out of thin plate having the width $D_1$ which is smaller than the depth $D_2$ of each of the passage grooves 38 formed in the outer surface of the movable core $19_c$, it is possible to simplify the structure to avoid a direct contact between the stationary core $18_c$ and the movable core $19_c$, while preventing all of the passage grooves 38 from being closed by the magnetic force killer 37.

Further, the conductor supporting base member 59 made of synthetic resin into a prism shape having a square cross section is disposed between a pair of bobbin arrays $R_1$ and $R_2$ arranged in parallel, the individual conductor plates 61 to 64 corresponding to the coils 42 are coupled by insertion to the first and second sides 59a and 59b opposed to the bobbin arrays $R_1$ and $R_2$ in the conductor supporting base member 59, and the common conductor plate 60 which is common to each of the coils 42 is coupled by insertion to the third side 59c of the conductor supporting base member 59. Therefore, by disposing each of the bobbins 41 such that the terminals 42a and 42b of the coils 42 are directed inward, i.e., toward the conductor supporting base member 59, it is possible to easily connect the connection terminals 60a provided to the common conductor plate 60 and the connection terminals 61a to 64a respectively provided to the individual conductor plates 61 to 64, by the extremely simple connecting structure.

Furthermore, when each of the individual conductor plates 61 to 64 are mounted to the conductor supporting base member 59, the conductor plate material 66 is prepared by press molding which material comprises the conductor plates 61' to 64' having shapes corresponding to the individual conductor plates 61 to 64 connected to each other by the connection plates $67_1$ to $67_4$, and the conductor plate material 66 is coupled by insertion to the conductor supporting base member 59 and thereafter, the connection plates $67_1$ to $67_4$ are knocked until they reach the hollows $68_1$ and $68_2$ provided to the conductor supporting base member 59 to cut them away. Therefore, there is no need to arrange the individual conductor plates 61 to 64 and thus, the number of working steps can be reduced to lower the manufacturing cost.

FIGS. 12 to 18 show a second embodiment. Portions or components corresponding to those in are designate by like reference characters.

Figure 12:
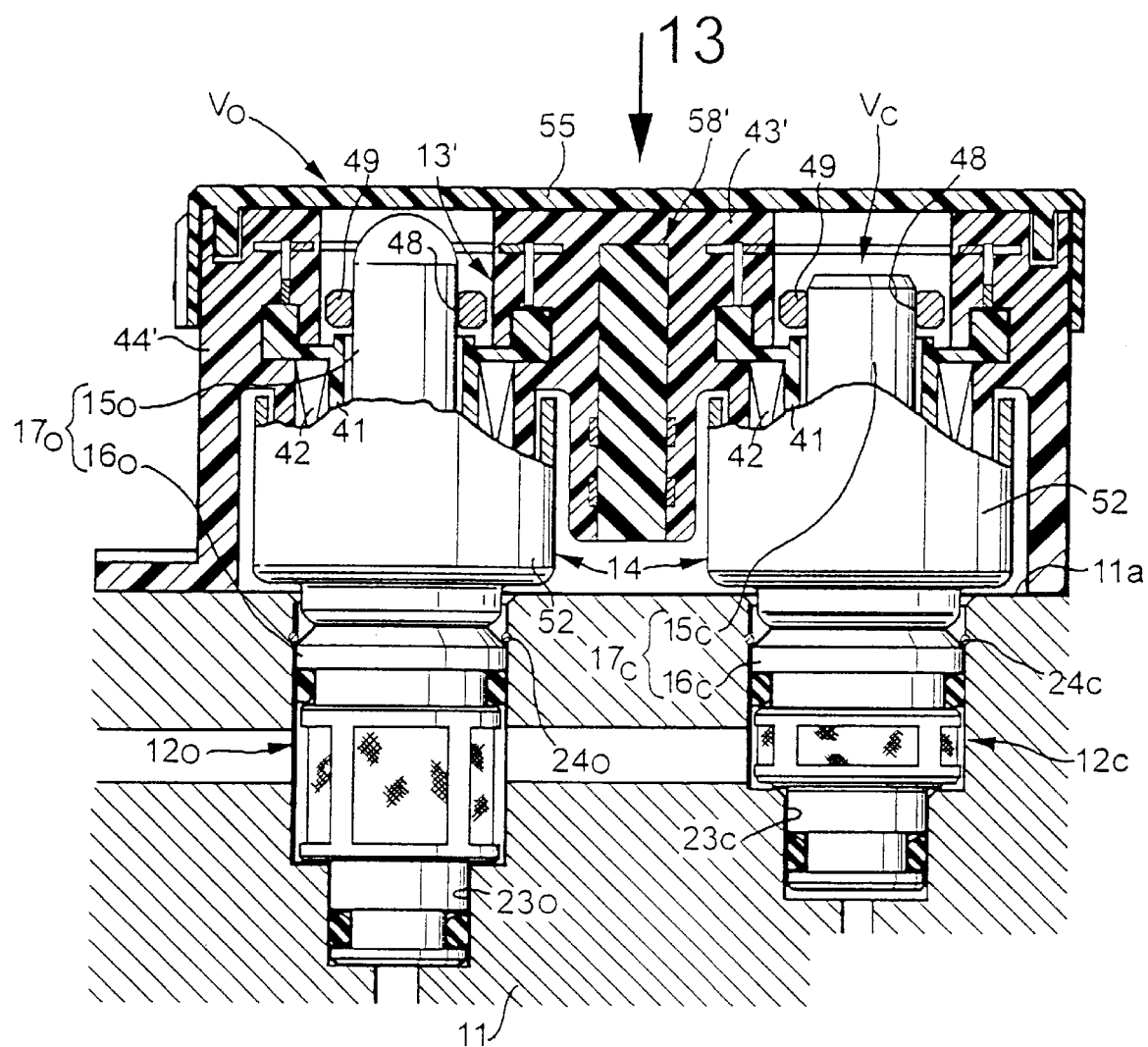
Figure 13:
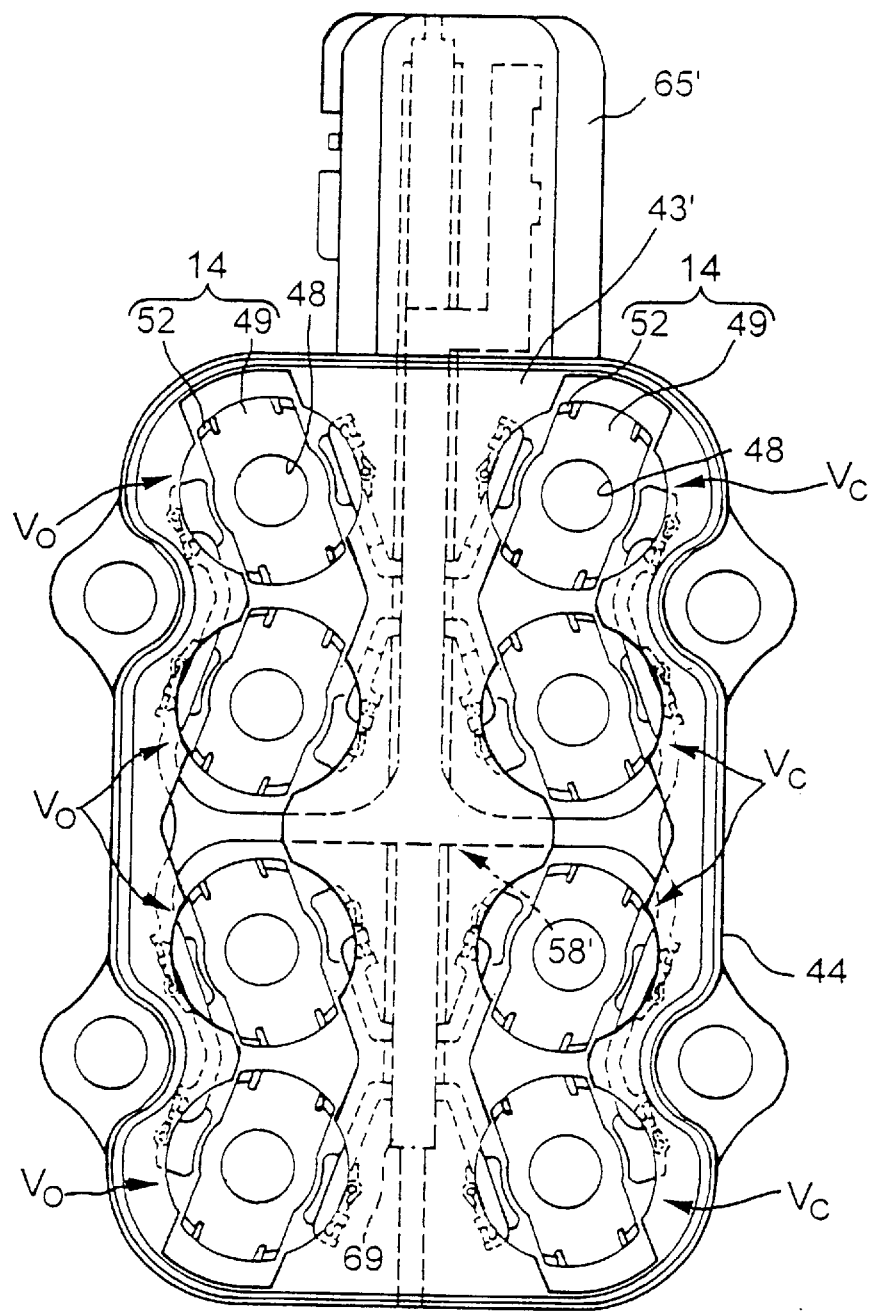

First, referring to FIGS. 12 and 13, a coil unit 13' which is common to four normally opened type electromagnetic valves $V_o$ and four normally closed type electromagnetic valves $V_c$ comprises a plurality of bobbins 41 through which guide cylinders $15_o$ and $15_c$ of valve operating units $12_o$ and $12_c$ are loosely passed, the bobbins 41 are buried in a mold section 43' which is made of synthetic resin and which is wound by coils 42. The mold section 43' is integrally formed with a square frame 44' clamped to one surface 11a of a base member 11 and is detachably provided with a lid 55.

A conductor plate assembly 58' for electrically connecting each of the normally opened type electromagnetic valves $V_o$ and each of the normally closed type electromagnetic valves $V_c$ to the coil 42 is buried in the mold section 43' between an array of the normally opened type electromagnetic valves $V_o$ and an array of the normally closed type electromagnetic valves $V_c$.

Figure 14:
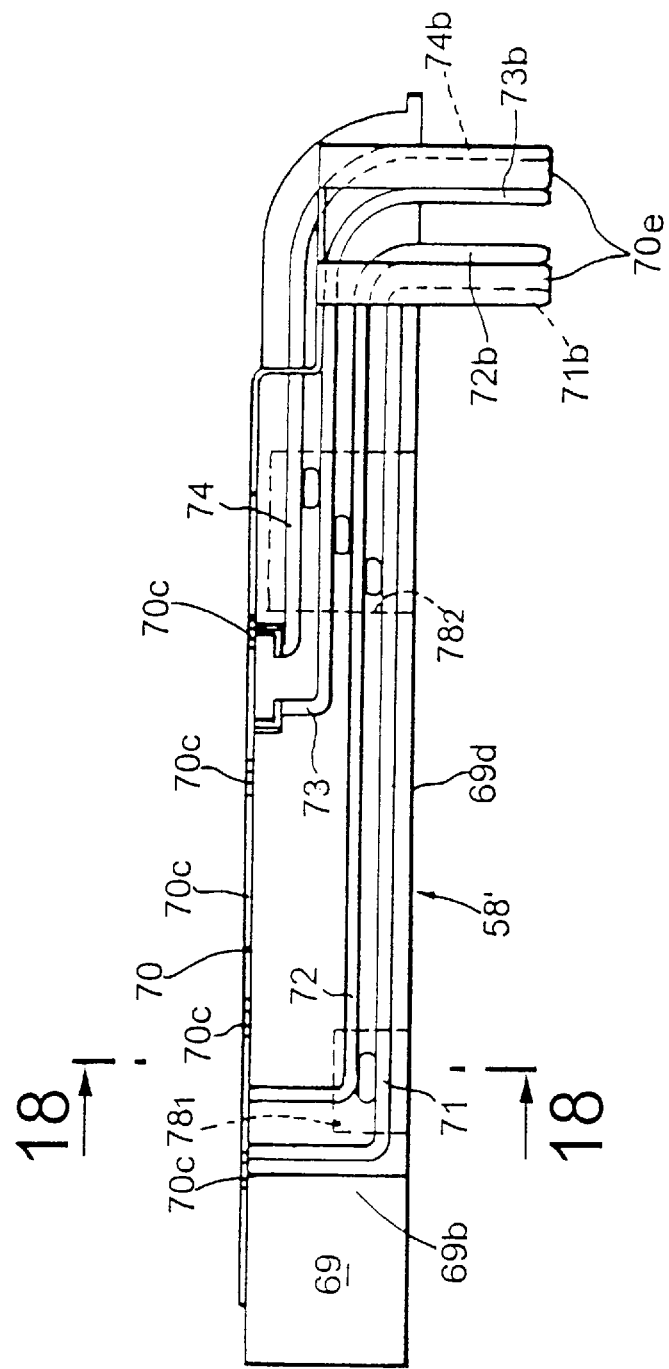
Figure 15:
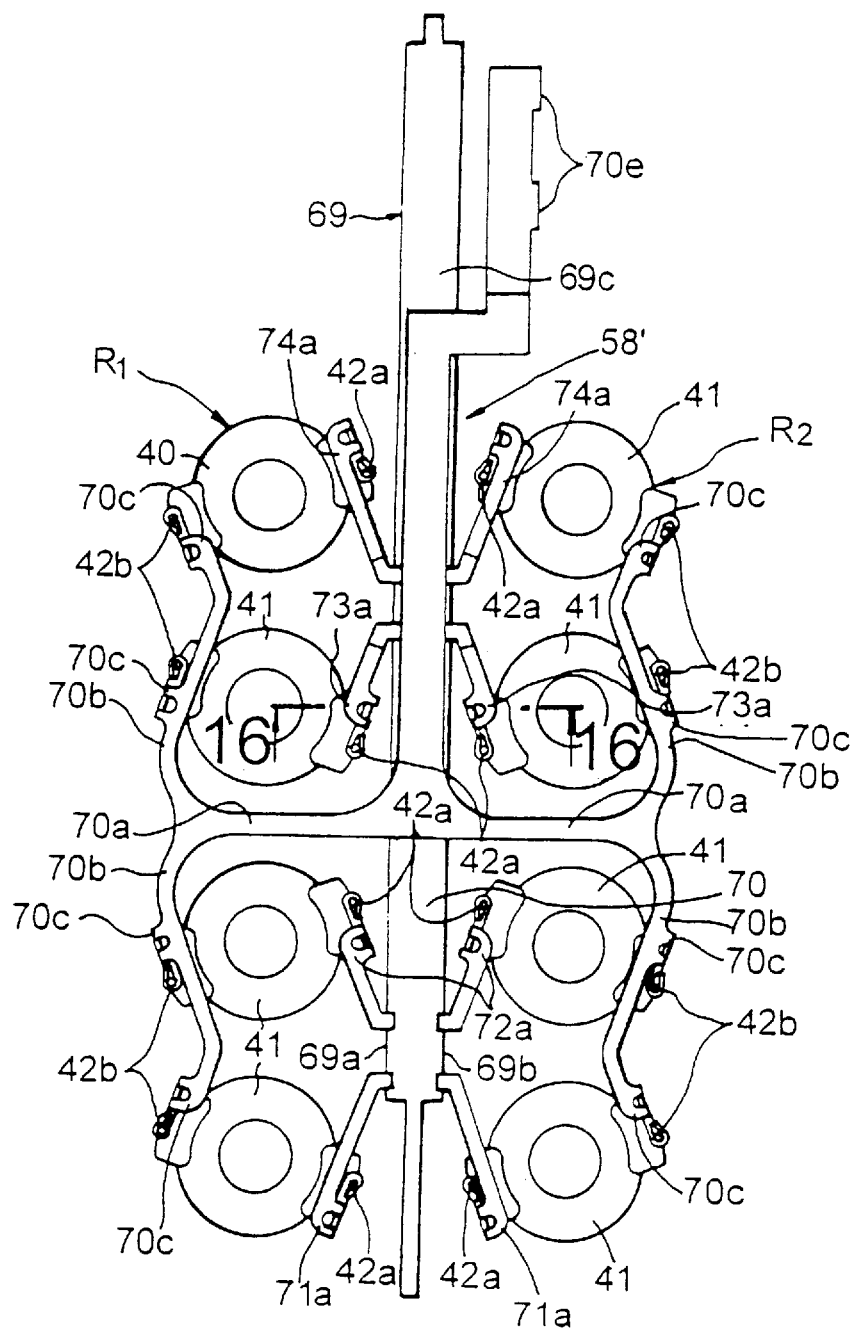
Figure 16:
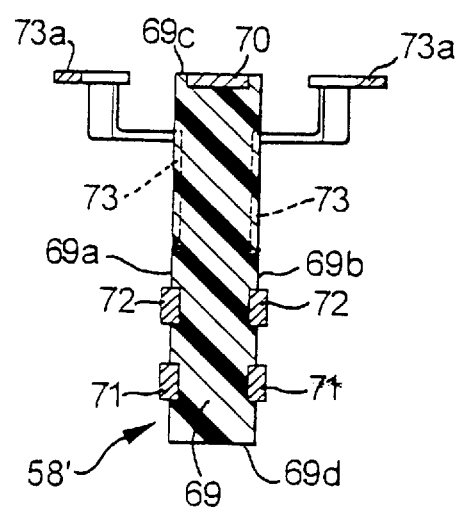

Referring to FIGS. 14 to 16, the conductor plate assembly 58', the common conductor plate 70 and two sets of a pair of individual conductor plates 71, 72, 73 and 74 are integrally coupled by insert-molding to a conductor supporting base member 69 made of synthetic resin.

As is shown in FIG. 15, before the coil unit 13' is formed, the bobbins 41 around which the coils 42 are wound are disposed in two parallel arrays each consisting of four bobbins 41 to form two bobbin arrays $R_1$ and $R_2$. The conductor plate assembly 58' is disposed between the bobbin arrays $R_1$ and $R_2$. Further, in both the bobbin arrays $R_1$ and $R_2$, each of the bobbins 41 is disposed such that one terminal 42a of the coil 42 wound around the bobbins 41 is disposed inward and the other terminal 42b is disposed outward.

The conductor supporting base member 69 is formed of synthetic resin into a prism shape having square cross section, and includes first and second sides 69a and 69b which are respectively opposed to the bobbin arrays $R_1$ and $R_2$, and third and fourth sides 69c and 69d which are perpendicular to the first and second sides 69a and 69b. Individual conductor plates 71 to 74 are respectively coupled by insertion to the first and second sides 69a and 69b of the conductor supporting base member 69, and a common conductor plate 70 is coupled by insertion to the third side 69c among the third and fourth sides 69c and 69d.

The individual conductor plates 71 to 74 are respectively provided with connection terminals 71a to 74a connected to the one terminals 42a of the coils 42 wound around the bobbins 41. The connection terminals 71a to 74a are projected sideways from the conductor supporting base member 69. The common conductor plate 70 is provided with a pair of projecting arms 70a, 70a extended opposite sides between the adjacent two of the bobbins 41, 41 at an intermediate portion of both the bobbin arrays $R_1$ and $R_2$, and with two sets of a pair of bypass arms 70b, 70b extended such as to bypass outward of the $R_1$ and $R_2$ from the projecting arms 70a, 70a. Each of the bypass arms 70b is provided with two connection terminals 70c, 70c connected to the other terminal 42b of the coil 42.

One congitudinally end of the conductor supporting base member 69 projects sideways from the frame 44' when the conductor supporting base member 69 is integrally formed with the frame 44'. A pair of connection terminals 70e, 70e provided to the common conductor plate 70 and the connection terminals 71b to 74b respectively provided to the individual conductor plates 71 to 74 are mounted to this one end of the conductor supporting base member 69. When the conductor plate assembly 58' is buried in the mold section 43' together with the bobbins 41 and is integrally formed with the frame 44', one end of the conductor supporting base member 69 is covered with a covering member made of synthetic resin and a coupler 65' (see FIG. 13) is integrally formed with the frame 44'. The connection terminals 70e and 71b to 74b are disposed in the coupler 65'.

Figure 17:
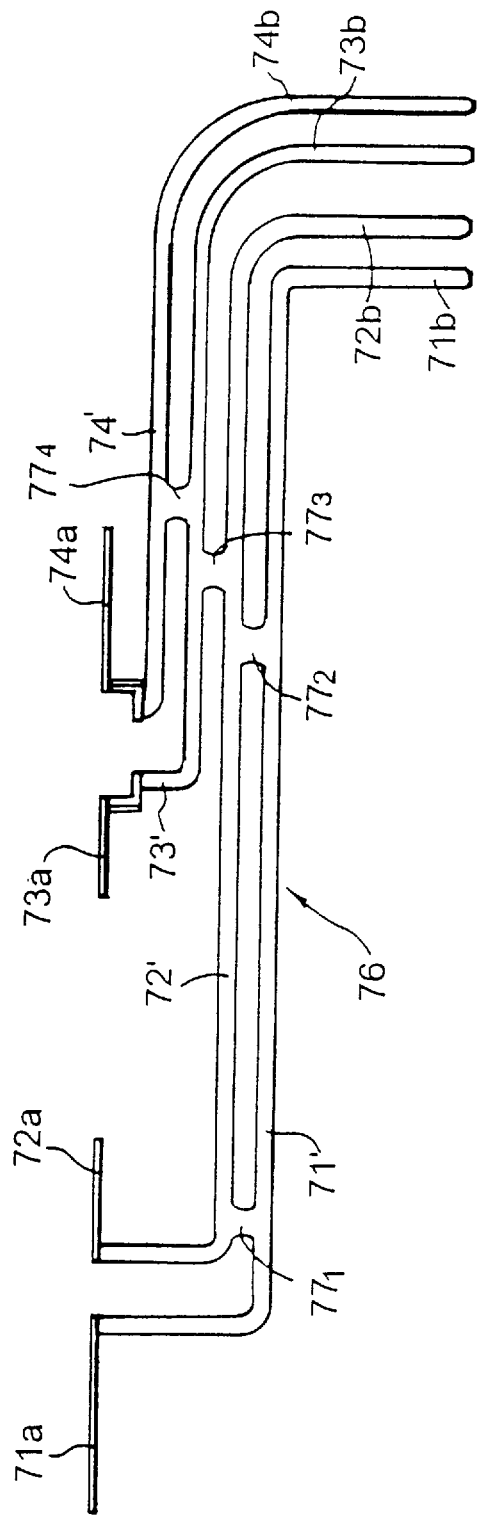
Figure 18:
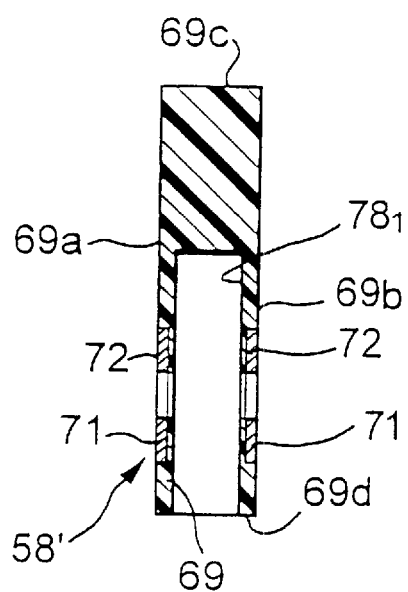

When each of the individual conductor plates 71 to 74 is formed, a conductor plate material 76 as shown in FIG. 17 is prepared by press molding. The conductor plate material 76 is formed by interconnecting conductor plates 71' to 74' having shapes corresponding to a plurality of individual conductor plates 71 to 74 mounted to one of the first an second sides 69a and 69b of the conductor supporting base member 69, by means of connection plates $77_1$ to $77_2$, respectively. More specifically, the conductor plate 71' corresponding to the individual conductor plate 71 is connected to the conductor plate 72' having the shape corresponding to the individual conductor plate 72 by the connection plate $77_1$ and $77_2$, the conductor plate 72' is connected to the conductor plate 73' having the shape corresponding to the individual conductor plate 73 by the connection plate $77_3$, and the conductor plate 73' is connected to the conductor plate 74' having the shape corresponding to the individual conductor plate 74 by the connection plate 77$_4$.

The conductor plate material 76 having such a shape is provided in pair, and they and the common conductor plate 70 are integrally coupled to the conductor supporting base member 69 by insert-molding. As is clearly shown in FIG. 18, the molded conductor supporting base member 69 is formed with a hollow 78$_1$ corresponding to the connection plate 77$_1$ of the conductor plate material 76 and a hollow 78$_2$ corresponding to the connection plates 77$_2$ to 77$_4$ of the conductor plate material 76. By knocking the connection plates 77$_1$ to 77$_4$ until they reach the hollows 78$_1$ and 78$_2$ to cut them away, the separated conductor plates 71' to 74', i.e., the individual conductor plates 71 to 74 are formed.

According to the second embodiment, the conductor supporting base member 69 made of synthetic resin into a prism shape having a square cross section is disposed between a pair of bobbin arrays R$_1$ and R$_2$ arranged in parallel, the individual conductor plates 71 to 74 corresponding to the coils 42 are coupled by insertion to the first and second sides 69$a$ and 69$b$ opposed to the bobbin arrays R$_1$ and R$_2$ in the conductor supporting base member 69, and the common conductor plate 70 which is common to each of the coils 42 is coupled by insertion to the third side 69$c$ of the conductor supporting base member 69. Therefore, by disposing each of the bobbins 41 such that the one terminal 42$a$ of the coils 42 is directed inward, i.e., toward the conductor supporting base member 69, it is possible to easily connect the connection terminals 71$a$ to 74$a$ respectively provided to the individual conductor plates 71 to 74 to the one terminal 42$a$ of the coil 42. Further, the common conductor plate 70 is provided with a pair of the projecting arms 70$a$, 70$a$ extended opposite sides between the adjacent bobbins 41, 41 at an intermediate portion between both the bobbin arrays R$_1$ and R$_2$, and with two set of a pair of the bypass arms 70$b$, 70$b$ extended such as to bypass the bobbin arrays R$_1$ and R$_2$ outward from the projecting arms 70$a$, 70$a$. And each of the bypass arms 70$b$ is provided with two connection terminals 70$c$, 70$c$. Therefore, it is extremely easy to connect the connection terminal 70$c$ of the common conductor plate 70 to the other terminal 42$b$ of the coil 42.

Furthermore, when each of the individual conductor plates 71 to 74 are mounted to the conductor supporting base member 69, the conductor plate material 76 is prepared by press molding which material comprises the conductor plates 71' to 74' having shapes corresponding to the individual conductor plates 71 to 74 connected to each other by the connection plates 77$_1$ to 77$_4$, and the conductor plate material 76 is insert-coupled to the conductor supporting base member 69 and thereafter, the connection plates 77$_1$ and 77$_4$ are knocked until they reach the hollows 78$_1$ to 78$_2$ provided to the conductor supporting base member 69 to cut them away. Therefore, there is no need to arrange the individual conductor plates 71 to 74 and thus, the number of working steps can be reduced to lower the manufacturing cost.

Although it will be understood that the invention is not limited to the above described embodiments, and various modification and design may be made without departing from the spirit and scope of the invention defined in claims.

What is claimed is:

1. An electromagnetic valve device comprising:
    a plurality of valve operating units, each including valve components such as a stationary core, a movable core, a valve body and a return spring, which are disposed in a valve housing having a guide cylinder connected at a base end thereof to a housing body fitted to and secured to a base member;
    a plurality of bobbins each having a center bore through which each of said guide cylinder is passed;
    a plurality of coils each wound around each of said bobbins;
    a plurality of magnetic path defining frames each of which surrounds each of said coils to magnetically couple a tip end of said guide cylinder and said housing body to each other; wherein
        said plurality of bobbins having said coils wound therearound are buried in a mold section made of a synthetic resin to form a coil unit, said coil unit being mounted to said base member, and each of said magnetic path defining frames being movably mounted in a cylindrical coil-correspondence portion formed in the mold section to cover each of said bobbins and each of said coils wound around said bobbins; and each of said magnetic path defining frames is provided at one end thereof with a fitting bore into which the tip end of said guide cylinder is fitted, the other end of each of said magnetic path defining frames being capable of abutting against said housing body, said magnetic path defining frames being movably mounted to said coil-correspondence portions, each of said guide cylinders being loosely passed through the center bore of each of said bobbins.

2. An electromagnetic valve device according to claim 1, further comprising a spring provided between each of said coil-correspondence portions and each of said magnetic path defining frames for biasing each of said magnetic path defining frames in a direction to come into abutment at its other end against each of said housing bodies.

3. An electromagnetic valve device according to claim 1 or 2, wherein each of said coil units is formed by burying, in said mold section, said plurality of bobbins in two lines in parallel to form a pair of bobbin arrays and said plurality of coils each wound around each of said bobbins in an attitude that a pair of terminals of said coil are disposed inwardly, said electromagnetic valve device further comprising: a conductor supporting base member disposed between both said bobbin arrays and formed into a prism shape having a rectangular cross section made of synthetic resin, said conductor supporting base member including first and second sides respectively opposed to both said bobbin arrays and third and fourth sides perpendicular to said first and second sides, respectively; a common conductor plate coupled by insertion to either one of said third and fourth sides of said conductor supporting base member and connected commonly to one of said terminals of each of said coils; and a plurality of individual conductor plates respectively coupled by insertion to said first and second sides of said conductor supporting base member, respectively, and individually connected to the other terminals of each of said coils; said conductor supporting base member, said common conductor plate and said individual conductor plates being buried in said mold section, each of said common conductor plate and said individual conductor plate being provided with a connection terminal which is mounted to a coupler provided at longitudinally one end of said conductor supporting base member.

4. An electromagnetic valve device according to claim 1 or 2, wherein each of said coil units is formed by burying, in said mold section, said plurality of bobbins in two lines in parallel to form a pair of bobbin arrays and said plurality of coils each wound around each of said bobbins in an attitude that one of a pair of terminals of said coil is disposed inwardly and the other terminal is disposed outwardly, said electromagnetic valve device further comprising: a conductor supporting base member disposed between both said bobbin arrays and formed into a prism shape having a rectangular cross section made of synthetic resin, said conductor supporting base member including first and second sides respectively opposed to both said bobbin arrays and third and fourth sides perpendicular to said first and second sides, respectively; a plurality of individual conductor plates each having a connection terminal connected to one of the terminals of each of said coil and coupled by insertion to said first and second sides of said conductor supporting base member; and a common conductor plate which is common to all of said coils and coupled by insertion to either one of said third and fourth sides of said conductor supporting base member; said conductor supporting base member, said individual conductor plates, and said common conductor plate being buried in said mold section, said common conductor plate being provided with: a pair of projecting arms extending toward opposite sides of the common conductor plate between two of said bobbins, respectively, which are adjacent to each other at an intermediate portion of both said bobbin arrays; and bypass arms having connection terminals each connected to the other terminal of each of said coils and bypassing outwardly of both said bobbin arrays from tip ends of both said projecting arms.

* * * * *